(12) United States Patent
Ford et al.

(10) Patent No.: US 8,723,121 B2
(45) Date of Patent: May 13, 2014

(54) IDENTIFICATION SYSTEM AND METHOD USING HIGHLY COLLIMATED SOURCE OF ELECTROMAGNETIC RADIATION

(75) Inventors: Timothy D. F. Ford, Beaconsfield (CA); Casey Stack, Centerville, UT (US)

(73) Assignee: The Flewelling Ford Family Trust, Quebec (CA)

( * ) Notice: Subject to any disclaimer, the term of this patent is extended or adjusted under 35 U.S.C. 154(b) by 737 days.

(21) Appl. No.: 12/745,198

(22) PCT Filed: Nov. 27, 2008

(86) PCT No.: PCT/CA2008/002089
§ 371 (c)(1),
(2), (4) Date: Oct. 29, 2010

(87) PCT Pub. No.: WO2009/067807
PCT Pub. Date: Jun. 4, 2009

(65) Prior Publication Data
US 2011/0036983 A1 Feb. 17, 2011

Related U.S. Application Data

(60) Provisional application No. 60/990,410, filed on Nov. 27, 2007.

(51) Int. Cl.
*G01J 5/00* (2006.01)
(52) U.S. Cl.
USPC .................................................... 250/338.1
(58) Field of Classification Search
CPC ............ G01J 5/0896; G01J 5/20; G01S 1/68; G01S 1/00
USPC ..................................................... 250/338.1
See application file for complete search history.

(56) References Cited

U.S. PATENT DOCUMENTS

| | | | |
|---|---|---|---|
| 3,693,623 A * | 9/1972 | Harte et al. | 606/9 |
| 4,481,445 A * | 11/1984 | Gorski | 315/14 |
| 5,142,288 A | 8/1992 | Cleveland | |
| 5,274,379 A | 12/1993 | Carbonneau et al. | |
| 5,396,243 A | 3/1995 | Jalink, Jr. et al. | |
| 5,541,654 A | 7/1996 | Roberts | |

(Continued)

OTHER PUBLICATIONS

PCT "International Search Report and Written Opinion" for International Application No. PCT/CA2008/002089, mailed, Mar. 16, 2009; 10 pages.

*Primary Examiner* — David Porta
*Assistant Examiner* — Mindy Vu
(74) *Attorney, Agent, or Firm* — Meyertons, Hood, Kivlin, Kowert & Goetzel, P.C.; Eric B. Meyertons

(57) ABSTRACT

An identification system and method comprising a beacon unit using a highly collimated source of electromagnetic radiation, which emits towards a thermal imaging unit highly directional radiation. In this manner, improved visual identification of the beacon unit and the carrier associated therewith through the imaging unit can be achieved over both short and long distances. In particular, detection of the beacon unit is aided by emitting highly collimated radiation with high power density at great distances. When detected by the sensor array, an image of the emitted radiation is indeed displayed as a bright spot of light on the display, thus eliciting the attention of a viewer observing a scene through the imaging unit. Blooming of an array of sensing elements provided in the imaging unit may further be fostered by delivering a great amount of power to the imaging unit, thus improving detection of the beacon unit.

24 Claims, 8 Drawing Sheets

(56) References Cited

U.S. PATENT DOCUMENTS

| | | |
|---|---|---|
| 5,737,119 A | 4/1998 | Mladjan et al. |
| 6,388,617 B1 * | 5/2002 | Flood et al. .................... 342/386 |
| 6,842,138 B1 | 1/2005 | Wilkinson |
| 6,911,652 B2 | 6/2005 | Walkenstein |
| 6,928,916 B2 | 8/2005 | Witte et al. |
| 7,034,300 B2 | 4/2006 | Hamrelius et al. |
| 2003/0147651 A1 | 8/2003 | Roes et al. |
| 2004/0113817 A1 | 6/2004 | Novak et al. |
| 2005/0224716 A1 * | 10/2005 | Armentrout et al. ...... 250/339.06 |
| 2006/0087474 A1 * | 4/2006 | Do et al. ........................ 342/386 |
| 2006/0188246 A1 * | 8/2006 | Terre et al. ..................... 396/275 |
| 2006/0232675 A1 | 10/2006 | Chamberlain et al. |
| 2007/0007436 A1 * | 1/2007 | Maksymowicz ............ 250/208.2 |
| 2009/0224154 A1 * | 9/2009 | Jancic et al. .................. 250/330 |

* cited by examiner

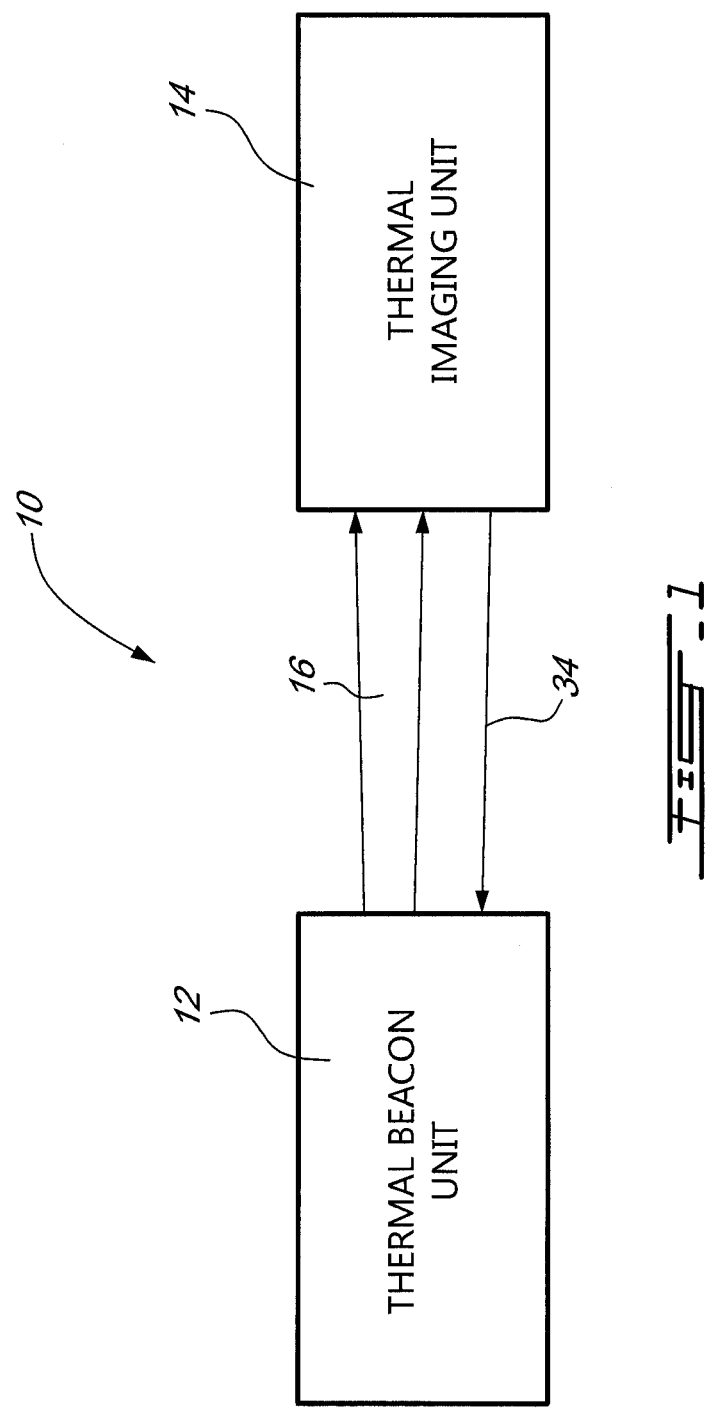

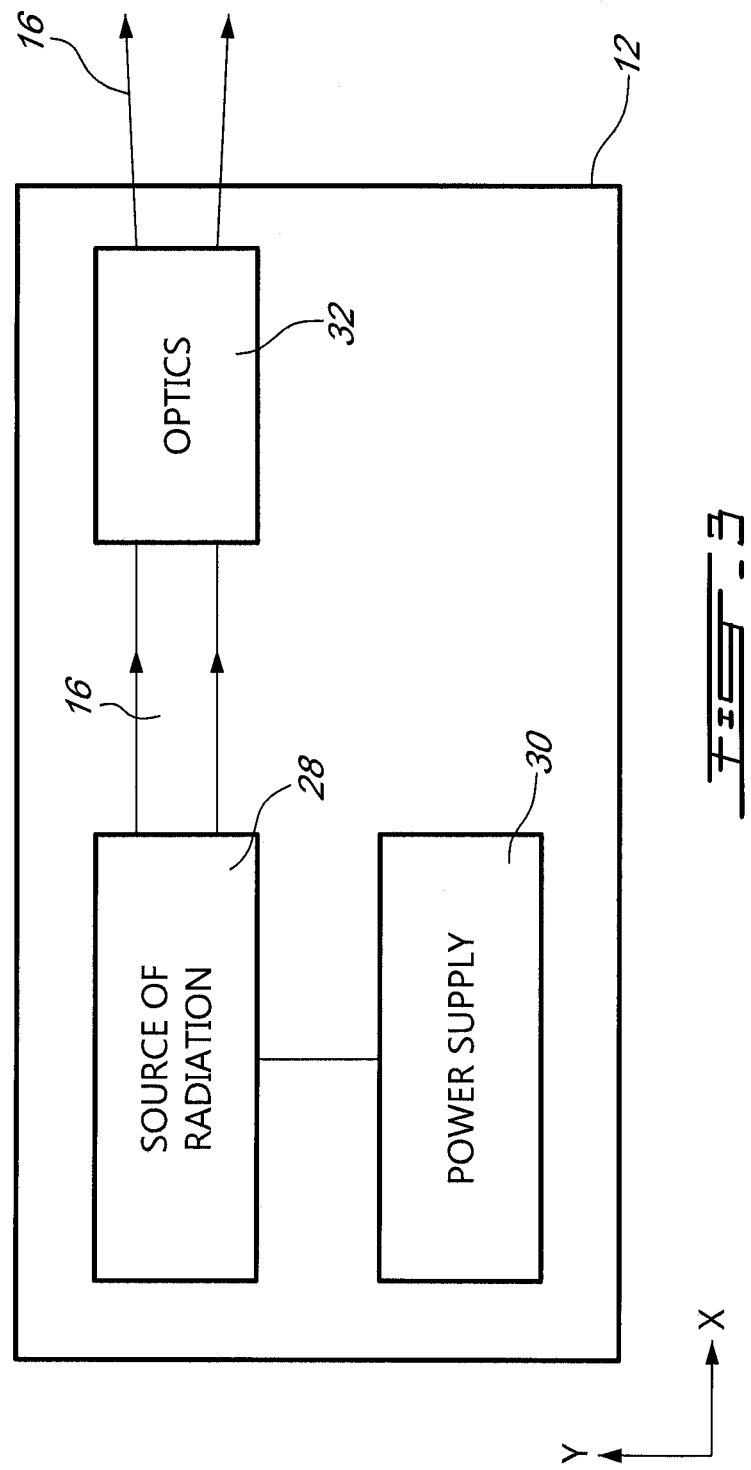

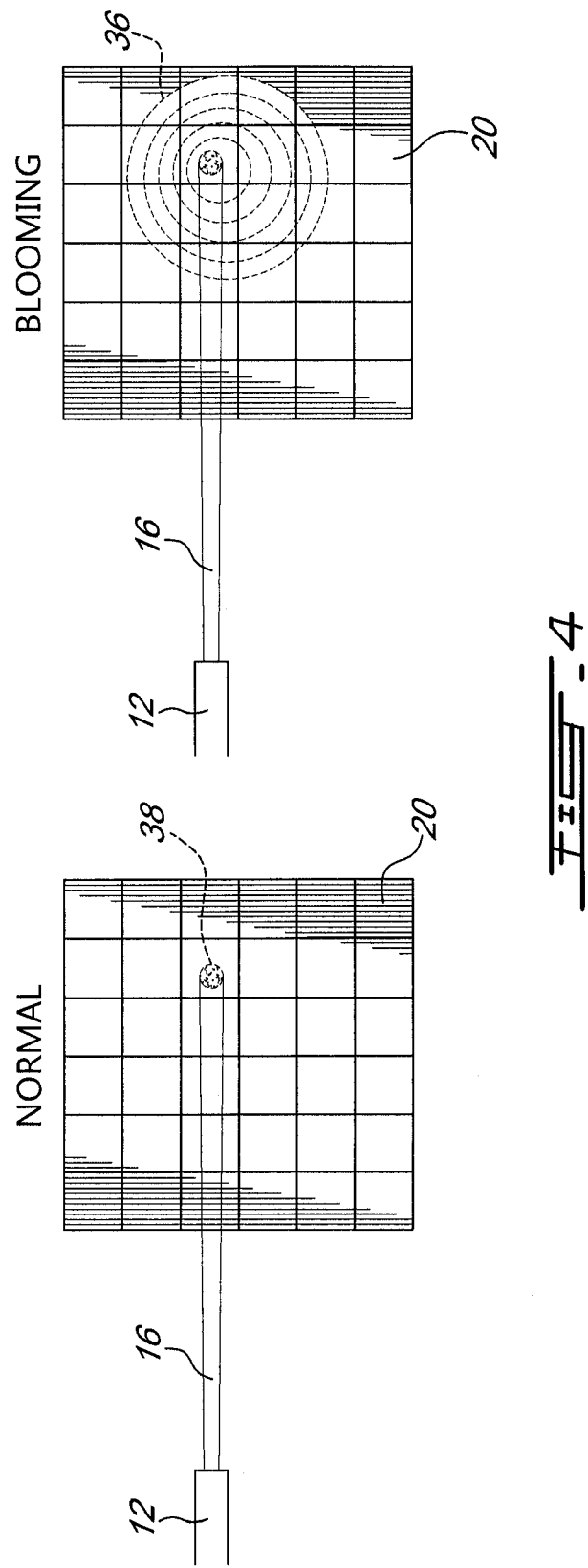

LASER EXCITING ENERGY
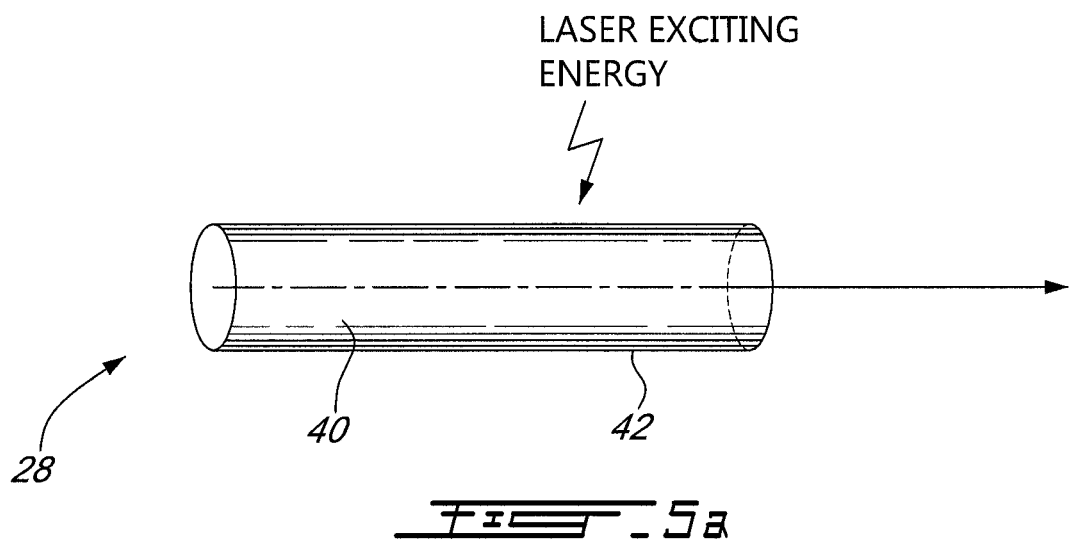
_Fig. 5a_
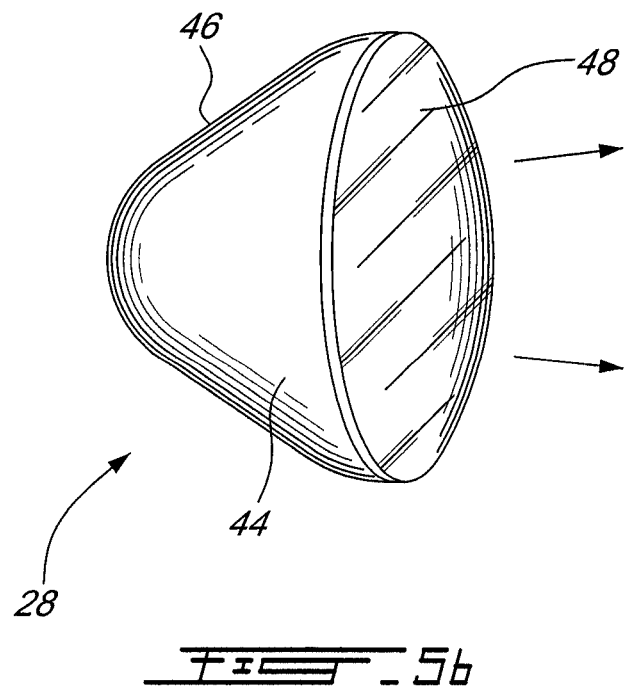
_Fig. 5b_

IDENTIFICATION SYSTEM AND METHOD USING HIGHLY COLLIMATED SOURCE OF ELECTROMAGNETIC RADIATION

CROSS-REFERENCE TO RELATED APPLICATIONS

This application is a National Entry Application of PCT Application No. PCT/CA2008/002089 filed on Nov. 27, 2008 and published in English under PCT Article 21(2), which itself claims benefit of U.S. provisional application Ser. No. 60/990,410, filed on Nov. 27, 2007. All documents above are incorporated herein in their entirety by reference. This application claims priority on U.S. Provisional Application No. 60/990,410 filed on Nov. 27, 2007 and which is herein incorporated by reference in its entirety.

FIELD OF THE INVENTION

The present invention relates to an identification system and method using a highly collimated source of electromagnetic radiation. In particular, the present invention relates to a beacon unit, which emits highly directional radiation towards a thermal imaging unit for secure and/or identification as friend or foe. The beacon unit may also be used to shield activities, equipment, etc., in the vicinity of the beacon unit from the operator of a thermal imaging unit.

BACKGROUND OF THE INVENTION

In military applications, secure and covert identification of an asset as friend or foe, also referred to as Identification Friend or Foe (IFF) is of the utmost importance. Indeed, it is primordial for military platform commanders to be able to accurately distinguish friendly aircrafts, vehicles, or forces from the enemy in order to prevent accidental fratricide (friendly casualties due to friendly fire). This becomes increasingly difficult when forces move covertly through unknown combat zones with limited visibility.

As known in the art, modern technology, and optical IFF systems in particular, ensures that action against friendly forces is reduced or prevented by visually identifying potential targets as friend or foe. Typically, optical IFF emitters used for such identification operate in the near Infrared (near-IR) wavelengths, i.e. between 0.7 and 1.3 micrometers (µm), a range very close to visible light. Although the radiation they emit is invisible to the human eye, a major disadvantage of these emitters is that they are highly visible via night vision systems (NVS), which are commonplace in military applications. NVS are optical systems, which allow images to be produced in levels of light approaching total darkness.

Thermal imaging provides an alternative to near-IR systems by enabling the location of living and inanimate bodies otherwise hidden to be revealed through their heat signatures. This is done by visualization of the battlefield with a thermal imaging device. These devices are sensitive to radiation emitted in the infrared range of the electro-magnetic spectrum. However, one drawback of thermal imaging systems is that they typically do not allow to identify and detect the bulk of a scene's distinguishable characteristics (i.e. people, places, or objects). In particular, in military applications, an observer cannot determine whether the displayed thermal image represents a "friendly" soldier (i.e. on their team) or an enemy as only the heat generated by the soldier is imaged on the thermal imaging device.

To overcome these and other drawbacks of existing optical IFF systems, the prior art reveals thermal beacons, which are used for friend or foe identification through a thermal imager and is otherwise invisible to the naked eye and near-IR imaging equipment. Such a beacon typically emits a continuous series of flashes visible to far-IR imaging equipment when in operation and is attached to each friendly asset, thus allowing for covert identification when the beacon is in operation. One drawback of such prior art thermal beacons, however, is that they typically rely on heating a blackbody (such as conductive plate or the like) to generate emissions in the infrared range. As a result, a significant delay is typically experienced between successive beacon flashes as the beacon is heated and subsequently cooled and as a result is typically unsatisfactory for signalling applications without the use of a complex shuttering system. Another drawback of such prior art devices is that blackbody radiation is inherently omnidirectional in nature and as a result the distance over which the beacon can be detected by the IR imaging equipment is limited. Still another disadvantage is that even if the beacon is proximate enough that it can be detected using the IR imaging equipment, the image presented to the operator on the display of the equipment as a result of the radiation emitted by the beacon is small relative to the entire field of view (in many cases just a single pixel) and therefore may go undetected by all but the most vigilant of operators.

SUMMARY OF THE INVENTION

The present invention addresses the above and other drawbacks by providing an identification system for identifying an asset. The system comprises an imaging device comprising an array of detectors sensitive to wavelengths within a predetermined band and a display, and a beacon positioned in proximity to the asset and at a distance from the imaging device. The beacon emits a beam of radiation comprised of wavelengths within the predetermined band and having a predetermined width at the distance. The beam is of sufficient strength such that when the beam is incident on the array, an image of the beam projected on the display has a relative width which is greater than the predetermined width.

In accordance with the present invention, there is also provided a method for identifying an asset in a system comprising an imaging device comprising an array of detectors sensitive to wavelengths within a predetermined band and a display, the asset positioned at a distance to the imaging device. The method comprises positioning a beacon in proximity to the asset, emitting using the beacon a beam of radiation comprised of wavelengths within the predetermined band and having a predetermined width at the distance, and directing the beam towards the imaging device. The beam is of sufficient strength such that when the beam is incident on the array, an image of the beam projected on the display has a relative width which is greater than the predetermined width.

Still in accordance with the present invention, there is also provided a beacon for use in an identification system for identifying an asset, the system comprising an imaging device comprising an array of detectors sensitive to wavelengths within a predetermined band and a display. The beacon comprises a source of radiation positioned in proximity to the asset and at a distance from the imaging device and a power supply for operating the source of radiation. The source of radiation emits a beam of radiation comprised of wavelengths within the predetermined band and having a predetermined width at the distance. The beam is of sufficient strength such that when the beam is incident on the array, an image of the beam projected on the display has a relative width which is greater than the predetermined width.

BRIEF DESCRIPTION OF THE DRAWINGS

FIG. 1 is a schematic diagram of a thermal beacon identification system in accordance with an illustrative embodiment of the present invention;

FIG. 3 is a schematic diagram of a thermal beacon unit in accordance with an illustrative embodiment of the present invention;

FIG. 4 is a schematic diagram of the blooming effect in accordance with an illustrative embodiment of the present invention; and FIGS. 5A and 5b are schematic diagrams of sources of radiation in accordance with alternative illustrative embodiments of the present invention.

DETAILED DESCRIPTION OF THE ILLUSTRATIVE EMBODIMENTS

Figure 2A:
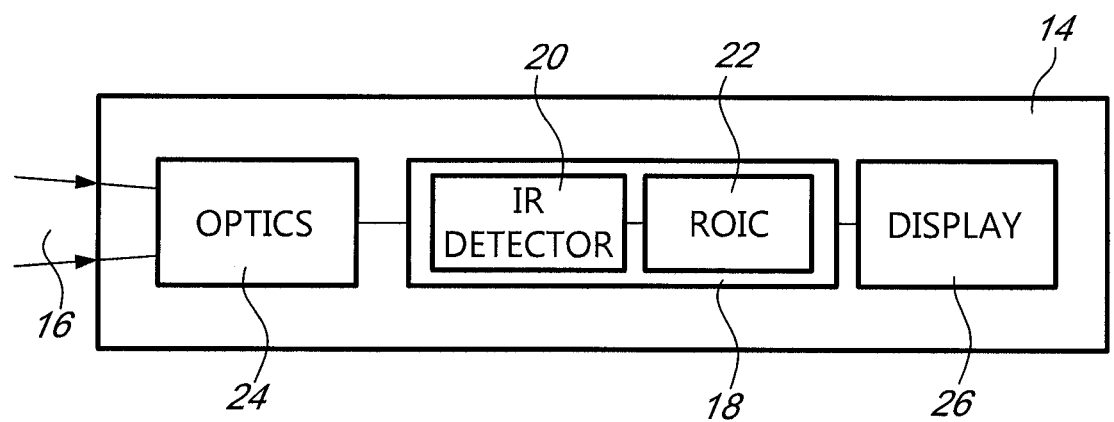
FIGS. 2a and 2b are schematic diagrams of a thermal imaging unit and an array of sensing elements in accordance with an illustrative embodiment of the present invention.

Referring now to FIG. 1, a thermal beacon identification system, generally referred to using the reference numeral 10, will now be described. The system 10 comprises a thermal beacon unit 12 and a thermal imaging unit 14 positioned at a distance thereto. In operation, the thermal beacon unit 12 emits radiation 16 projected in the direction of the thermal imaging unit 14 for identification of the thermal beacon unit 12 and associated carrier (soldier, vehicle, or the like). When detected by the thermal imaging unit 14, an image of the radiation 16 is displayed as a spot on the thermal imaging unit 14, thus eliciting the attention of a viewer observing a scene through it. The system 10 therefore allows for easy visual identification of specific locations, people, items, targets, and the like through the thermal imaging unit 14.

Figure 2B:
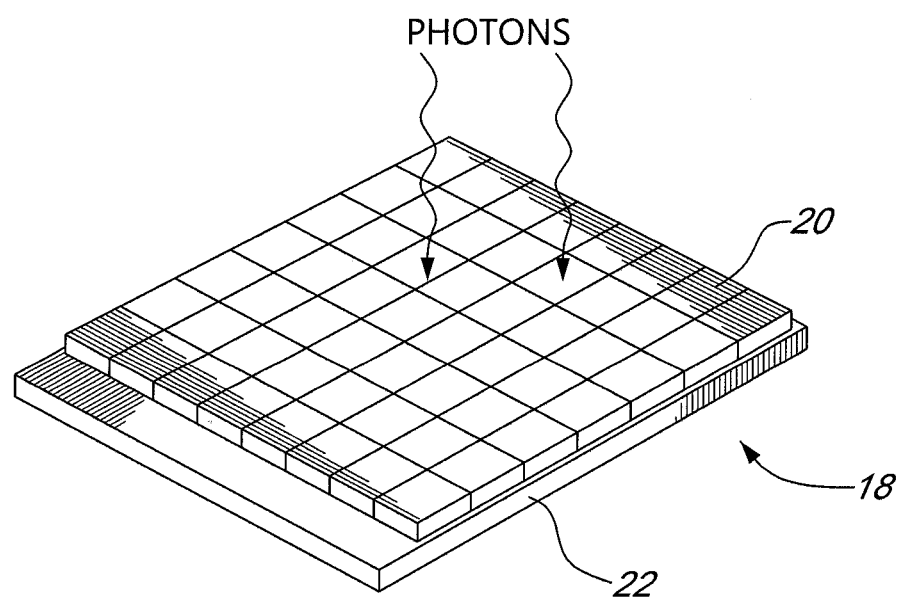

Referring now to FIGS. 2a and 2b in addition to FIG. 1, the thermal imaging unit 14 illustratively comprises an array of sensing elements 18, also referred to as a Focal Plane Array (FPA), consisting of Infrared (IR) detector elements 20 and electronics implemented on a Read Out Integrated Circuit (ROIC) 22 for image processing. The ROIC 22 typically serves as a substrate with the array of IR detector elements 20 being typically bonded thereon in order to create the FPA, as shown in FIG. 2b. The thermal imaging unit 14 further includes conventional optics (i.e. lenses, mirrors, and the like) as in 24 for shaping and focusing incoming IR radiation as in 16 emitted by a given object in a scene (in this case the thermal beacon unit 12) and a display 26 for displaying an image of the detected object.

Typically, thermal imaging units as in 14 detect radiation in the IR range and convert it into visible light. As known in the art, thermal imaging is usually performed in a predetermined band of wavelengths, illustratively the IR wavelength region of around 8 to 12 micrometers (μm) or 3 to 5 μm (with many devices being listed in the 7 to 15 μm or 3 to 7 μm range) so as to reduce the effects of atmospheric absorption. The 8 to 12 μm band has the advantage that an object at 25 degrees Celsius emits close to fifty (50) times more radiation in this longer wavelength band than at the shorter 3 to 5 μm band. Also, imaging units which operate in the 3 to 5 μm range are generally more expensive and necessitate cooling of the device elements (as shorter wavelength waves have higher energy). Still, imaging units operating in the 3 to 5 μm range have the advantage of not suffering from sun bloom. The choice to operate in either the shorter or longer wavelength band is therefore dependant on the intended application. In one embodiment of the present invention, the thermal imaging unit 14 illustratively operates in the wavelength band from 8 to 12 μm, which corresponds to the thermal Infrared (thermal-IR) range of IR radiation. In this range, sensors can obtain a completely passive picture of the outside world based on thermal emissions only without the need for any external light.

Still referring to FIGS. 2a and 2b in addition to FIG. 1, in operation, the radiation 16 focused by optics 24 is first scanned by the array of IR detector elements 20, which may be linear, i.e. comprise a single row or column of IR detector elements 20, or two-dimensional, i.e. consist of a matrix of columns and rows of IR detector elements 20. The temperature rise in the material of an IR detector element 20 caused by the absorption of electromagnetic radiation as in 16 results in a change in some measurable property (e.g. electrical charge, voltage, or resistance) of the detector material. For this purpose, a variety of IR detectors 20 such as resistive bolometers, in which a change in temperature results in a change in resistance, may be used. A detailed temperature pattern or thermogram is then created and translated into electric impulses, which are sent to the ROIC 22 for signal processing (e.g. amplification, multiplexing . . . ) in order to generate data for display. Each IR detector element 20 usually corresponds to one pixel of the display 26 of the thermal imaging unit 14, on which displayed data may appear as grayscale or different colours depending on the intensity of the IR emission 16. As known in the art and as is the case with any camera system, in most cases, the impinging radiation 16 will fill the optical device (e.g. lens, system of lenses, optical train) as in 24 used to focus the radiation onto the imager array but will be shown only on a few pixels of the display 26. In embodiments of the present invention where data is being sent on the beam 16, there might be only one IR detector element 20 onto which the optics 24 would focus all radiation 16.

IR detectors as in 20 are generally classified into quantum and thermal types. To improve detector performance, and thus ensure accurate measurement, as well as keep the detector element at constant temperature, it is generally desirable for the quantum detectors generally to be cooled. As known in the art, various cooling techniques are currently available such as cryogenic cooling using liquid nitrogen or dry ice, thermoelectric cooling, Joule-Thomson cooling, and gas-circulation cooling. Because detector elements are typically sealed inside a container that cools them below 0° C. (or 32° F.), the use of quantum IR detectors provides for good resolution and sensitivity. Quantum detectors thus offer high detection performance as well as fast response speeds. However, their photosensitivity is dependent on wavelength and quantum detectors are expensive and susceptible to damage from rugged use. Today, the elements of most IR detectors 20 are thermal detectors, which use the IR energy as heat and whose photosensitivity is independent of wavelength. They typically include sensors, which detect photons at a particular wavelength and generate an electrical charge, voltage, or resistance, in relation to the number of photons detected. Thermal detectors do not require cooling, i.e. they operate at (or close to) ambient temperature without the need for artificial means to decrease the temperature if the IR array.

Referring now to FIG. 3 in addition to FIG. 1, the thermal beacon unit 12 illustratively comprises a source of radiation 28 operated by a power supply 30. The thermal beacon unit 12 may further illustratively comprise conventional optics as in 32 used to steer the beam 16 into a desired shape, as will be discussed herein below. The source of radiation 28 is selected to emit electromagnetic energy in the desired wavelength range, illustratively 8 to 12 µm, in a highly directional or collimated (i.e. rays substantially parallel) manner. As a result, the thermal beacon unit 12 is highly visible at short and long distances along a narrow emission trajectory via thermal imaging units as in 14, as will de discussed in further detail below, while being undetectable at any reasonable distance by common night vision equipment. Before reaching the thermal imaging unit 14, the radiation 16 emitted by the source of radiation 28 is optionally shaped into a variety of geometries via optics 32 to meet specific needs of given applications, as will be explained in further detail herein below.

Referring now to FIG. 4 in addition to FIGS. 2a and 3, a phenomenon referred to as blooming may occur when an IR detector as in 20 (and thus the corresponding pixel on the display 26) is saturated with bright radiation. In this case, the maximum amount of charge that can be accumulated in an individual pixel, defined by the pixel's full well capacity, is reached. As known in the art, the charge capacity of a detector 20 can either be limited by the individual pixel characteristics or the detector itself, and is defined by the maximum amount of charge that the detector 20 can collect and transfer while still maintaining all of its design performance specifications. When this limit is reached, the pixel or detector 20 is described as being saturated and accumulation of additional charge generated by incoming photons results in overflow of the excess electrons into adjacent device structures. The direction of electron flow typically depends on the construction of the detector element 20 and usually happens on one axis x or y. Still, as known in the art, for some IR detectors 20 (e.g. bolometers or pyroelectric detectors), blooming may not be due to charge well overflow, as discussed herein above. Instead, blooming may be related to the specific design and control characteristics of the IR detector 20 or even to thermal bleed, which is evident when a signal from any source reaches a pixel on the array and the thermal energy generated at that pixel moves into neighbouring pixels having a lower temperature.

Still referring to FIG. 4 in addition to FIGS. 2a and 3, blooming is typically perceived as having a number of potentially undesirable effects reflected in the output of the thermal imaging unit 14 (i.e. the captured images). These effects often range from image streaks and erroneous pixel signal values to complete breakdown at the output amplification stage, producing a dark image. However, in the preferred embodiment of the present invention, blooming is fostered to advantageously ease visual identification of the thermal beacon unit 12, which becomes highly visible through thermal imaging units as in 14 over both short and long distances. For this purpose, and as discussed further herein below, the thermal beacon unit 12 uses a highly collimated source of radiation 28, which has very high power density at great distances. As a result a relatively great amount of power is delivered to the thermal imaging unit 14, and such amount of power is sufficient to result in saturation of the IR detectors 20 and high charge overflow between adjacent pixels of the display 26. Blooming of the entire pixel array therefore occurs leading to the beam 16 appearing on the display 26 as a diffused bright generally circular patch of light 36 instead of the typical small bright spot 38 expected from a highly directional beam 16. Indeed, the image of the beam 16 projected on the display 26 positioned at a given distance from the thermal beacon unit 12 will have a relative width, which is greater than the width of the beam 16 at that distance. Detection of the radiation emitted from the thermal beacon unit 12 by an operator observing the scene through the thermal imaging unit 14 is therefore aided, thus allowing for more efficient Identification Friend or Foe (IFF). The degree of blooming could further be adjusted as desired by varying the amount of power incident on the array 18. Illustratively, the thermal beacon unit 12 may comprise a power up and down mode or an attenuator (not shown), which would allow the user to increase or decrease the power output of the source of radiation 28, thereby increasing or decreasing the degree of blooming accordingly. The thermal beacon unit 12 could also be programmable as an additional feature.

Still referring to FIG. 4 in addition to FIGS. 2a and 3, in other embodiments of the present invention, blooming is not fostered but detection is simply aided due to the fact that the emitted radiation 16 is highly collimated with very high power density, and thus brighter than conventional thermal sources at a given distance. As a result, the spot of light 38, which appears on the display 26 is brighter than would be the case for other conventional thermal beacon units as in 12. In this case, imaging software (not shown) may illustratively be used to further enhance the visibility of the spot of light 38. For example, circles, arrows, and the like may be imaged on the display 26 near or around the displayed spot of light 38, which then becomes even more readily detectable.

Referring now to FIG. 5a in addition to FIG. 3, the source of radiation 28 may be one of a plurality of lighting devices including laser devices such as gas, liquid or chemical lasers, quantum cascade lasers, direct diode or diode pumped solid state (DPSS) lasers, other solid state lasers, and optical parametric oscillator sources. As known in the art, lasers emit radiation in a narrow, low-divergence beam with a well-defined wavelength, divergence being the increase in beam diameter with distance from the aperture from which the beam emerges. They consist of an active medium 40 with appropriate optical properties inside an optical cavity 42, with a means to supply energy to (i.e. excite) the active medium 40 in order to produce radiation. In addition to the known advantages of lasers (e.g. high peak power, directionality, high power density at great distances due to collimation not achievable with other radiation sources), gas lasers in particular have the advantage of containing relatively inexpensive active material (i.e. gas) and allowing for simplified cooling mechanisms in comparison to other laser technologies. In addition, RF excited gas lasers can be built out metal or ceramics instead of glass, as generally used, in order to improve their ruggedness. Depending on the application, one of a plurality of gas laser types may be used.

Still referring to FIG. 5a in addition to FIG. 3, as known in the art, carbon dioxide ($CO_2$) lasers are very high-power lasers. They are also very efficient with a ratio of output power to exciting power as large as 20% (illustratively about 5 to 10% in the present application). Typically, they emit a beam of infrared radiation having principal wavelength bands centered around 9.4 and 10.6 µm. Since the 10.6 µm wavelength provides good visibility via long wave thermal imaging cameras while remaining invisible to detection by the naked eye or Night Vision Systems (NVS), $CO_2$ lasers provide a good laser choice for the source of radiation 28 of the present invention. Moreover, as $CO_2$ lasers typically laser across a couple of dozen lines from about 9 to 11 μm, a $CO_2$ laser may alternatively be built to illustratively operate at a wavelength about 9.5 μm with some of the light being subsequently frequency doubled to generate a wave with a wavelength of 4.75 μm using well understood practices. In this manner, a single laser tube could generate light waves for both the desired shorter (3 to 5 μm) and longer (8 to 12 μm) wavelength bands. As a result, significant benefits in terms of cost, size and required power supply for the overall system 10 may be achieved by using such a dual wavelength thermal beacon unit 12 built from a single wavelength $CO_2$ laser.

Still referring to FIG. 5a in addition to FIG. 3, carbon monoxide (CO) lasers provide another type of laser which may be used for emissions visible for the 4 to 7 μm thermal camera range. Nitrogen could be used in the IR range as well since nitrogen lasers are typically cheaper to build and more efficient.

Still referring to FIG. 5a in addition to FIG. 3, when gas lasers are used as the source of radiation 28, the latter may be manufactured as a single laser device, which emits both 10 μm and 4 or 5 μm radiation simultaneously. For this purpose, CO and $CO_2$ gases may either be used in the same laser cavity as in 42 at the same time, or in two separate cavities 42. Alternatively and depending on the applications, the source of radiation 28 may comprise some laser units, which emit only 4 or 5 μm radiation and a separate laser unit, which emits at 10 μm.

Still referring to FIG. 5a in addition to FIG. 3, the source of radiation 28 may also be implemented as a Quantum Cascade Laser (QCL), a semiconductor laser that emits in the mid- to far-IR portion of the electromagnetic spectrum, i.e. typically above 3 μm. Since QCLs comprise a periodic series of thin layers of varying material composition, varying electrical potential is introduced across the length of the device. By suitable design of the layer thicknesses, it is possible to tune the emission wavelength of the QCLs over a wide range in the same material system. Indeed, unlike other types of lasers, QCLs can be manufactured to emit at nearly any wavelength from a few μm (i.e. about 4 μm) to about 100 μm, such a wavelength tunability feature being very useful for maximizing atmospheric transmission as many infrared wavelengths in the band of interest are typically absorbed by gases in the air. Illustratively, QCLs would be used in the present invention as the source of radiation 28 for short wavelength range thermal beacon units as in 12 while $CO_2$ lasers would be used for higher power longer wavelength thermal beacon units as in 12.

Still referring to FIG. 5a in addition to FIG. 3, QCLs further have the advantage of being typically electrically pumped with small DC voltages and currents. Moreover, while advantageously providing relatively high electrical to optical efficiencies, QCLs are very small and compact compared to gas lasers and do not comprise any moving parts, breakable components, or gases, thus proving rugged and highly suitable for military applications. Thus, in another embodiment of the present invention, two QCLs operating at two different wavelengths may illustratively be used, or one gas laser cavity and one QCL alternatively. Also, as will be apparent to a person of skill in the art, it may be possible to use a laser-like cavity relying on spontaneous photon emissions instead of coherent stimulated emissions, which form the basis of lasers.

Still referring to FIG. 5a in addition to FIG. 3, in another alternative embodiment of the present invention, the source of radiation 28 may comprise Optical Parametric Oscillators (OPO). OPOs are parametric oscillators, generally consisting of an optical resonator and a nonlinear optical crystal, that allow frequency mixing of input laser light waves to generate new harmonically related output wavelengths. As a result, laser light frequencies, which are difficult or impossible to obtain from any laser, may be synthesized from other frequencies, thus offering the potential for wavelength tuning with very wide tuning ranges. For instance, OPOs may be used to double or half the frequency of light, add two (2) frequencies of light together to create a higher frequency or subtract two (2) frequencies of light to create lower frequencies. Such a process can also be subsequently cascaded more than once to create yet more frequencies for which a laser cannot be directly built. As use of OPOs requires one or more coherent pump sources with high optical intensity, typically laser light sources such as DPSS or direct diode lasers, the present invention may illustratively use QCLs as laser light sources for pumping an OPO to tune the wavelength of the light output by the source of radiation 28. In this manner, OPOs can be used for thermal beacon units as in 12 operating in the short to mid wavelength range.

Still referring to FIG. 5a in addition to FIG. 3, as known in the art, certain types of lasers may be subject to collateral radiation, i.e. radiation other than that associated with the primary laser beam. Unlike QCLs, gas lasers, diode and lamp pumped lasers are particularly susceptible to such radiation, which may take the form of visible and/or near-IR radiation generated in the laser optical cavity 42. As a result, it becomes desirable to place a filter at the laser output in order to remove such unwanted collateral radiation while still allowing enough radiation to escape at the laser aperture so as to enable detection of the thermal beacon unit 12 at great distances. For this purpose, visible and near-IR filter material could be used.

Referring now to FIG. 5b in addition to FIG. 3, the source of radiation 28 may further be a gas discharge lamp, which typically sends electrical discharge through an ionized gas 44. Such lamps use a noble gas such as argon, neon, krypton, and xenon or a mixture of these. They are also usually filled with additional materials such as mercury, sodium, and/or metal halides. As known in the art, in operation, the gas 44 is retained within a chamber or tube 46 and ionised using electrodes (not shown). The ionised gas 44 emits photons at wavelengths dictated largely by the gas 44 being ionised. In order to ensure that emissions emitted by the ionised gas 44 fall within a desired infrared range, a variety of materials can be used as a filtering separator or window 48 to separate the gas 44 held within the chamber or tube 46 from the surrounding environment. These materials serve the dual purpose of retaining the gas 44 within the chamber or tube 46 and filtering out unwanted wavelengths of radiation that are emitted by the ionised gas 44. For example, the separator 48 could be fabricated from silicon (operates at 9 μm), germanium (operates between 2 and 12 μm), sapphire (operates from the UV range to 5 μm), germanium sapphire, sodium chloride, lead salt, potassium bromide and potassium chloride (although the latter is a hydroscopic material which attracts water molecules and therefore care must be taken to shield the separator from the surrounding environment). Zinc selenide and zinc sulfide (operates between 600 nm and 20 μm) could be used as well, either alone (if used for the sole purpose of retaining the gas 44) or in combination with other materials (if it is desirable to achieve filtering of the emitted wavelengths, as these materials are generally transparent to visible and near-IR radiation). A CO or $CO_2$ gas discharge lamp could also be manufactured, resulting in a source of radiation 28 having an IR signature and power similar to CO or $CO_2$ lasers, yet being significantly cheaper. However, it will be apparent to one of skill in the art that, unlike with lasers which emit a well collimated beam, the gas discharge lamp will likely generate radiation in all directions (also called isotropic radiation), which could be further collimated by the use of conventional optical devices such as lenses and the like.

In order to obtain high concentrations of radiation and high peak power, thus ensuring that the thermal beacon unit 12 is easily detectable over long distances, as discussed herein above, it is desirable for the discharge lamp to produce regular flashes of radiation (discharge strobe) instead of producing continuous or quasi-continuous radiation. Indeed, as known in the art, flashes emanating from strobe sources are typically very intense. Also, as the lamp may emit radiation in various spectral lines, i.e. broadband in nature, a separator or window or the like illustratively placed in front of the lamp's cavity can be doped to filter particular wavelengths of the radiation emitted by the discharge strobe in order to tailor to specific applications. The bandwidth of the emitted radiation may further be tailored to the desired ranged (e.g. between 3 and 5 μm or 8 and 12 μm) by an increase in the pressure of the ionized gas, resulting in a decrease in bandwidth.

Referring to FIG. 3, the system 10 benefits from the fact that the radiation 16 is generated in a highly directional manner. Indeed, unlike other common sources of radiation, which isotropic radiation, resulting in the energy decreasing as an inverse square of the distance, the source of radiation 28, preferably either a laser or discharge strobe, emits energy with a very high radiance value (indicates how much of the power emitted by an emitting or reflecting source will be received per solid angle of propagation by an optical system). This high radiance allows the emitted radiation 16 to be highly collimated and thus have high power density at great distances, as discussed herein above. Since the power density emitted by the thermal beacon unit 12 does not significantly drop at great distances, it is a very efficient device for long-range detection. Indeed, as known in the art, detection by thermal imaging devices at any range does not depend on the total power emitted by the source of radiation as in 28 but rather on the power density at the location of the thermal imager. Moreover, the thermal beacon unit 12 has the additional advantage of consuming less power than would be required for detection of an isotropic radiator by many orders of magnitude at longer distances.

Still referring to FIG. 3, the radiation emitted by the thermal beacon unit 12 may be required to meet the internationally accepted Maximum Permissible Exposure (MPE) standard, in order to make the beam "eye-safe". As known in the art, the MPE is the highest power or energy density of a source of radiation considered safe, i.e. having a negligible probability for creating a damage to an observer's eye for instance. In order to abide by MPE requirements at the device's aperture (e.g. 100 mW/cm$^2$ for continuous wave (CW) emissions), some sources of radiation 28 may be designed with a large aperture that allows the radiation energy density at long distances to remain high while the power density is decreased to a lower level for safety, thus ensuring that the MPE is not exceeded at the aperture. In this case, large dimensions may be used in one or both x and y axes as well as highly divergent beams generated using optics as in 32, as will be described in more detail herein below.

Still referring to FIG. 3, the source of radiation 28 is illustratively excited through by the power supply 30. The source of radiation 28 may be battery operated (rechargeable or disposable) for remote or man-carry operation, or powered from vehicle power or facility power at a military base. The power supply 30 may further comprise a control unit (not shown) integrating digital devices such as microprocessors and the like for controlling the level of power delivered to the source of radiation 28. When lasers are used as the source of radiation 28, either Direct Current (DC) or Radiofrequency (RF) electrical signals may be used to excite it. As known in the art, when DC exciting is used, it is desirable for the laser to be manufactured having an insulated bore whereas, for gas lasers in particular, RF exciting has the advantage that the laser tube can be made of conductive material, such as metal, or ceramic instead of glass, thus lowering the costs and increasing ruggedness. Moreover, unlike DC exciting, RF exciting does not disassociate gas molecules, and in particular the $CO_2$ molecules. Thus additional time or gas are not necessary to recombine the molecules and as such, RF excited lasers can significantly reduce the gas ballast size and overall cost of the device.

Referring now to FIG. 1 in addition to FIG. 3, a laser used as the source of radiation 28 may be built to emit a continuous beam (CW operation), a single pulse, or a train of short or long pulses (pulsed operation). In the CW mode of operation, the output of the laser is relatively consistent with respect to time and maintained by a steady power supply as in 30. In the pulsed mode of operation however, the output of the laser varies with respect to time. Pulsing may be used to increase detection and discrimination visually either by eye or by automated means. Pulsing can further be used to transfer information or indicate the serial number of each thermal beacon unit 12, or other data. When in pulsed mode, the source of radiation 28 may be operated at several times (typically two (2) to six (6) times) the CW power level, thus maintaining high peak power levels while reducing the length desirable for the laser tube. In addition, to meet the MPE safety standards mentioned herein above, the source of radiation 28 may alternatively be operated in short pulse mode instead of long pulse or CW.

The duty cycle and frequency of the laser may also be selected as uniform or changing, or a combination thereof. For instance, low duty cycle pulsed operation may be used to extend the life of the power supply 30 as well as lower the cost and complexity of a potentially integrated cooling system (not shown). High frequency pulses may be used to decrease or prevent instances of missing identification due to passing over the observer's location between pulses. Indeed, the thermal beacon unit 12 is not visible at any significant distance unless it is pointed directly at the observer's thermal imaging unit 14. Thus, if the output beam 16 is swept and not held constant and the duty cycle is low, the observer might miss a pulse of the thermal beacon unit 12.

Referring back to FIG. 1, in other embodiments of the present invention, the thermal beacon unit 12 may be designed to only emit radiation when interrogated by a signal 34 from the thermal imaging unit 14. For this purpose, the signal 34 could illustratively be sent via RF or optically, along with an encoded password as a security measure. As a result, this would ensure that a beacon unit as in 16 only divulges the location of its related friendly asset (soldier, vehicle, or the like, as will be described herein below) when the private password is received rather than all of the time.

Still referring to FIG. 1, the first intended use of the system 10 is indeed to save the lives of military personnel by reducing fratricide. For this purpose, and as discussed herein above, the thermal beacon unit 12 emits highly collimated radiation that facilitates effortless identification when using thermal imaging devices as in 14. The system 10 may be useful in ground-to-ground applications in particular, where it is desirable for battlefield soldiers to positively identify one another, as well as distinguish equipment or people locations, including cover locations, caches, and the like. In these applications, it is commonplace for most ground vehicles and foot soldiers to carry thermal imaging devices, which are typically designed to be small and handheld. Installing thermal beacon units as in 12 on all friendly assets within a requested target area would therefore prove very useful for IFF applications. Indeed, the thermal beacon unit 12 carried by a friendly vehicle or soldier will only be visible to friendly observers carrying thermal imaging devices as in 14, on which it will appear as a bright diffused spot.

In aircraft-to-ground and aircraft-to-aircraft applications, thermal imaging cameras are also often used to equip aircrafts, thus making the system 10 useful for identifying friendly equipment (e.g. landing zones) and people in these applications. For example, the system 10 could be used to alert the aircraft of a "friend". In this case, the thermal beacon unit 12 carried by a given soldier or aircraft would emit radiation towards the friendly aircraft for identification, thus avoiding friendly fire in close air support and further indicating points of interest or temporary landing or drop zones. Other applications such as personnel or mobile unit identification, safety (no-fire) zone identification, or sea and coastal rescue operations may also be considered.

Referring now to FIGS. 6a and 6b and 7a, 7b, 7c and 7d in addition to FIG. 3, the radiation 16 emitted by the thermal beacon unit 12 can be tailored to specific applications. For this purpose, the optics as in 32 may be designed to shape and collimate the beam 16, as mentioned briefly herein above. For lasers in particular, the degree of collimation of the radiation 16 could be adjustable. In some uses (e.g. pointing applications), it may be desirable to generate a beam 16 that diverges from the x axis by a few (e.g. one (1)) degrees only at a given distance, thus substantially projecting a narrow intense beam (point) of radiation that can be directed over long distances. In this case, it is desirable for the power intensity to be concentrated in this narrow beam so that the thermal beacon unit 12 can be accurately detected by the thermal imaging unit 14, as discussed herein above. In other uses (e.g. flashlight applications), it may be desirable to generate a wide beam 16 that can cover a large area and be more readily visible (e.g. by aircrafts). In this case, the beam 16 could be designed to diverge highly over the x and/or y axes so as to generate radiation shaped as a half hemisphere for example. For this purpose and in order to tailor to specific uses of the thermal beacon unit 12, the collimation of the beam 16 may be adjusted by various conventional methods known in the art.

Figure 6A:
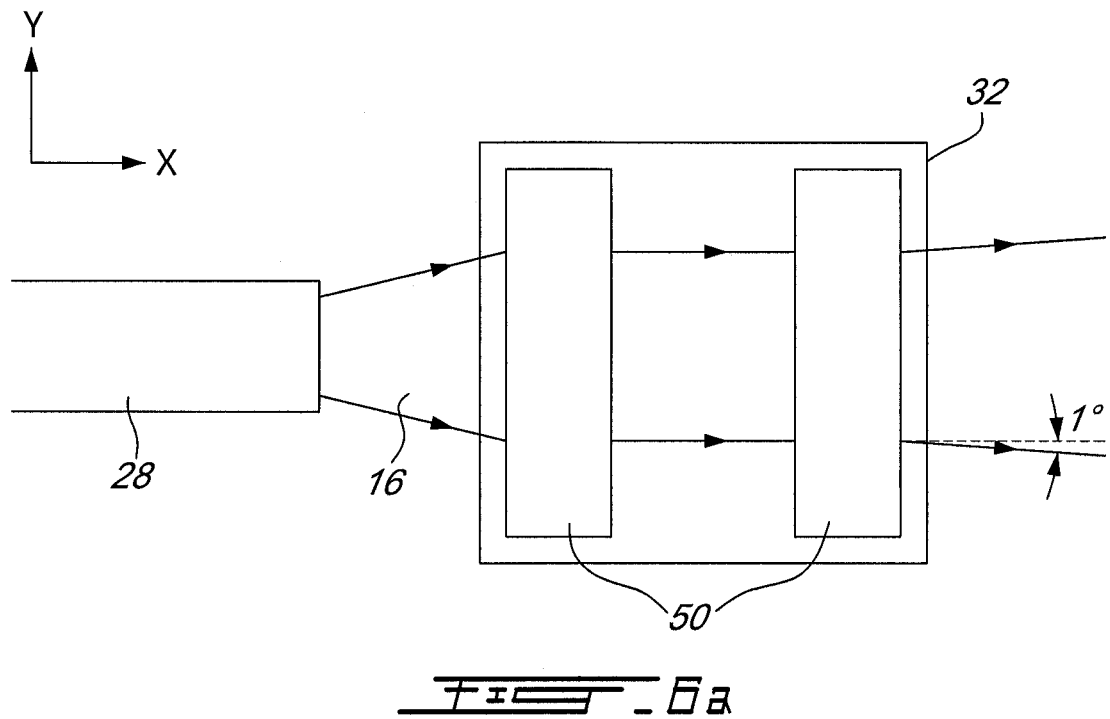
FIG. 6A depicts a schematic diagram of optics having two or more conventional lens placed in series.
Figure 6B:
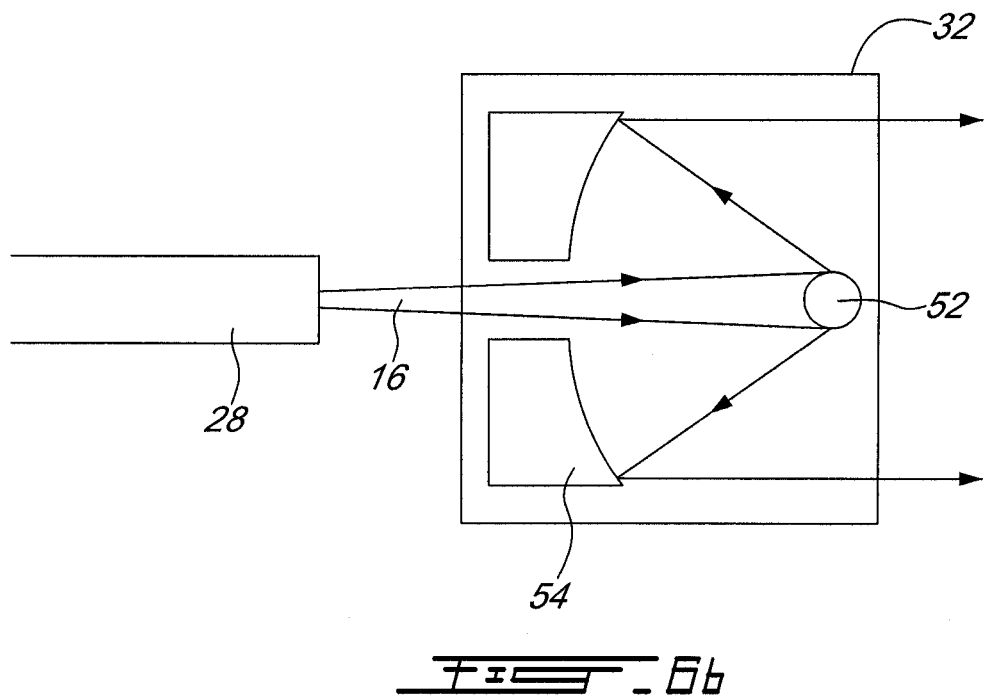
FIG. 6B depicts a schematic diagram of optics having a sub-reflector.
Figure 7A:
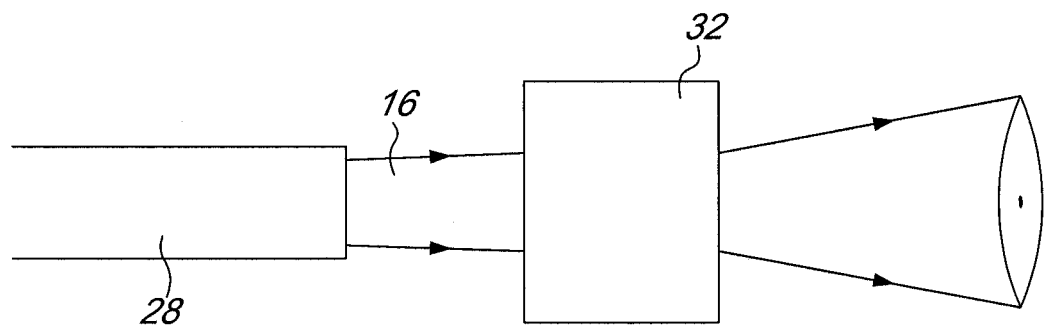
FIG. 7A depicts a schematic diagram of an optical system producing a cone output.
Figure 7B:
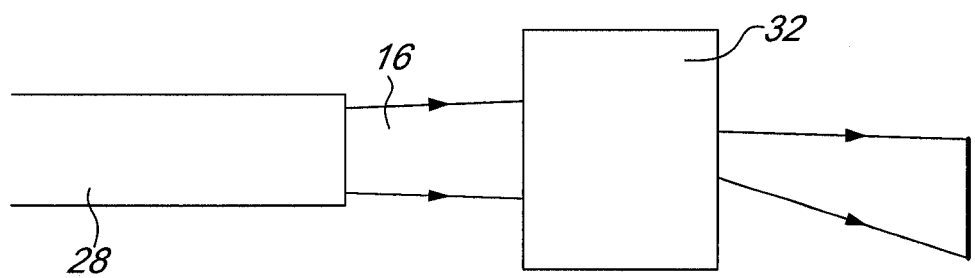
FIG. 7B, 7C depicts a schematic diagram of an optical system producing a triangle collimated in one axis.
Figure 7C:
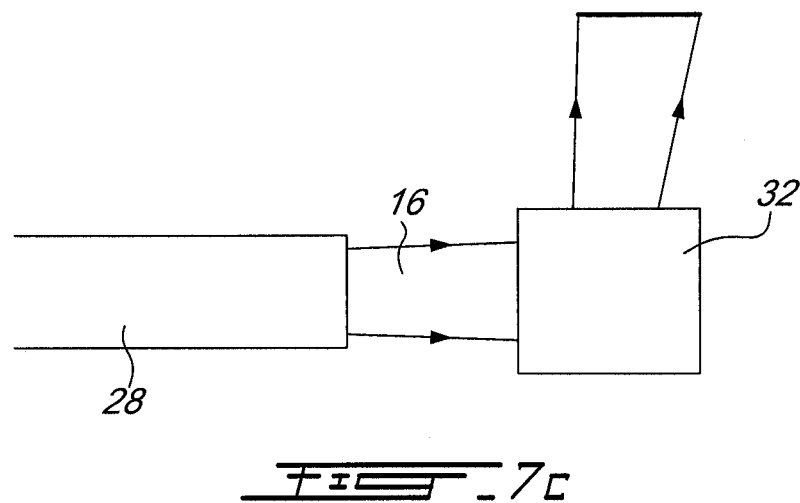
Figure 7D:
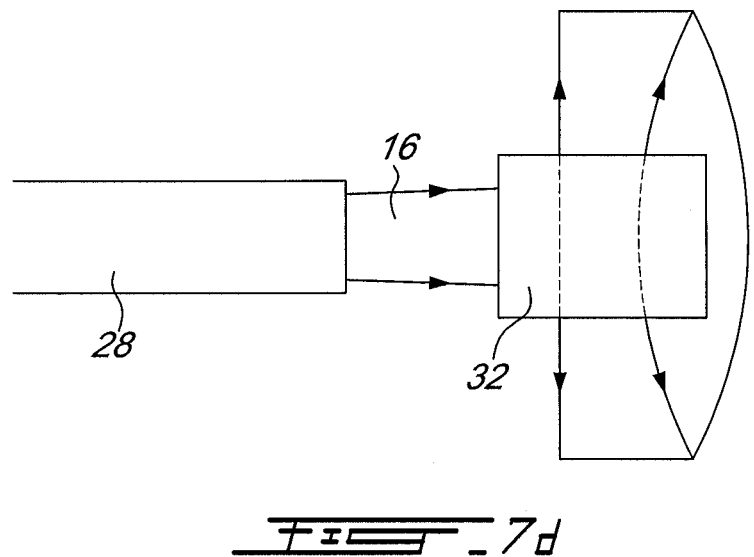
FIG. 7D depicts a schematic diagram of an optical system that produces hyperbolic-shaped beams.

Still referring to FIGS. 6a and 6b in addition to FIG. 3, the optics 32 could illustratively comprise a combination of two or more conventional lenses 50 placed in series (e.g. conventional telescope configuration) at the output of the source of radiation 28, as shown in FIG. 6a. When disposed in this manner at a proper distance, the radiation thus emitted would be ideally collimated. To vary the degree of collimation, i.e. increase or decrease the divergence of the beam 16, the position of the lenses 50 would preferably be adjustable along the x axis such that the emitted radiation 16 may be adjusted from ideally collimated to more or less divergent at a given distance from the output of the thermal beacon unit 12. Alternatively, conventional telescope designs may also be used to "up-collimate" the emitted beam 16. In this case and as known in the art, the beam divergence would be lowered and the power density at the detection location (i.e. the thermal imaging unit 14) increased. The beam 16 could also be shaped to diverge reasonably high over both x and y axes. For example, the beam 16 could be shaped with a divergence of 25 to 30 milliradians, i.e. the beam would illuminate an area of about 25 to 30 meters on a side at a typical range limit of about 1000 meters. In either case, and as will be apparent to one skilled in the art, the optics 32 will be positioned at a proper distance so as to obtain the desired effect. In particular, according to the application and design requirements (e.g. if it is desired to maintain a lower and safer laser class), the optics 32 could for example allow for an increase in divergence only.

Still referring to FIGS. 6a and 6b in addition to FIG. 3, the collimation of the beam 16 could also be adjusted by directing it towards a sub-reflector 52, such as a ball bearing having a size of one (1) to three (3) times the diameter of the beam 16, so that the radiation directed thereon is illustratively reflected as a hemisphere. An aspheric reflector 54 is then illustratively placed around the sub-reflector 52 such that the beam 16 thus shaped is well collimated. As will be apparent to a person skilled in the art, by varying the position of either the sub-reflector 52 or the aspheric reflector 54 along the x axis, the collimation of the beam 16 may be varied from well collimated (i.e. substantially parallel rays) to highly divergent.

Referring now to FIGS. 7a, 7b, 7c and 7d in addition to FIG. 3, using various combinations and orientations of fixed positive and negative spherical, aspheric, cylindrical, irregular or highly custom lenses, and other optical devices arranged to tailor to specific needs, the shape of the beam 16 could be further adjusted, resulting in a cone (see FIG. 7a), or a triangle collimated in one axis (x or y) (see FIGS. 7b and 7c) for example. Holographic optical elements (HOE lenses) may also be used to shape the beam 16 as well as reflectors, metallic mirrors, regular and/or unusual and irregular mirrors, having spherical, pyramid, or other convex or concave configuration. Moreover, a device such as a rotating selecting wheel (not shown) or the like with various lenses, apertures and/or custom HOE lenses or diffractive phase plates combined with linear sliders or the like, could illustratively be used to change the shape of the beam 16. This would lead to relatively simple construction and operation. Typically, the choice of the optics 32 will be influenced by the overall cost and efficiency of the system 10.

Still referring to FIGS. 7a, 7b, 7c and 7d in addition to FIG. 3, in some embodiments, it may be desirable to project a horizontal line upward into the airspace at the optimum attack or landing approach angle. When viewed from above, the emitted radiation 16 would be shaped as a triangle with a source at the thermal beacon unit 12 (see FIG. 7c). In this manner, a Visual Approach Slope Indicator (VASI), which is a system of lights that provides visual descent guidance information during the approach to a landing strip, will have been built. Although traditional VASIs are built with visible light, the thermal beacon VASI of the present embodiment will have the advantage of being invisible to all personnel and aircraft not equipped with thermal imagers, thus proving very useful in conflict areas.

Where a triangle collimated in one axis (x or y) is generated, the thermal beacon unit 12 may further include a moving device (not shown), such as a rotary motor, magnet, or the like, for imparting linear, reciprocating or rotary motion to the beacon's aperture, thus distributing the beam 16 or plane of radiation (as generated in FIGS. 7b and 7c) in multiple directions over time. As a result of this rotation, a cone-shaped beam (see FIG. 7a) or a substantially hyperbolic-shaped beam (see FIG. 7d) may be obtained. Alternatively, the beam 16 may be dispersed in a plurality of directions simultaneously without the use of a moving device. Instead, the design may include a reflector or mirror including a device such as a chromed ball bearing or modified ball bearing of appropriate diameter onto which the beam 16 is directed, as discussed herein above in reference to FIG. 6b. Also, spinning mirrors, prisms and the like (not shown) could be used to scan the beam 16 at a high speed. In this case, the device, e.g. a mirror, would illustratively be spun (along the x, y axis or other predetermined axis) to generate orbiting of the beam 16.

Acousto-optic (AO) devices such as acousto-optic deflectors (AODs) could also be used to accomplish the same effect in a solid-state manner (for lasers especially).

Referring back to FIG. 1, in an alternative illustrative embodiment of the present invention, the thermal beacon unit 12 can be used as a device to cloak or shield activities what would otherwise be visible to the operator of a thermal imaging unit 14. Operation is in principle the same, in that the source of radiation 16 is used to drive the IR detector portion (reference 20 in FIG. 2a) of the unit 14 into saturation, thereby resulting in the occurrence of the blooming effect within the unit 14. As those elements of the IR detector 20 subject to the blooming effect are no longer able to provide any useful detail, features which would otherwise have been detectable are effectively masked by the blooming effect. As a result, the user of a beacon as in 12 could use the beacon to shield his activities from the operator of the thermal unit 14.

Although the present invention has been described hereinabove by way of specific embodiments thereof, it can be modified, without departing from the spirit and nature of the subject invention as defined in the appended claims.

What is claimed is:

1. An identification system for identifying an asset, the system comprising:
   an imaging device, the imaging device comprising an array of detectors sensitive to wavelengths within a predetermined band and a display; and
   a beacon positioned in proximity to said asset and at a distance from said imaging device, said beacon emitting a beam of radiation comprised of wavelengths within said predetermined band and having a predetermined width at said distance, said beam of sufficient strength such that when said beam is incident on said array, an image of said beam projected on said display has a relative width which is greater than said predetermined width.

2. The identification system of claim 1, wherein said array of detectors is a Focal Plane Array and said detectors are thermal detectors.

3. The identification system of claim 1, wherein said predetermined band is the infrared band.

4. The identification system of claim 3, wherein said predetermined band is between 3 and 7 micrometers.

5. The identification system of claim 3, wherein said predetermined band is between 7 and 15 micrometers.

6. The identification system of claim 1, wherein said image of said beam projected on said display exhibits a blooming effect.

7. The identification system of claim 1, wherein said sufficient strength is the strength sufficient to cause a blooming effect and further wherein a degree of said blooming effect is adjustable by varying a level of power supplied to said beacon, thereby varying a level of said sufficient strength.

8. The identification system of claim 1, wherein said beacon is selected from the group consisting of a laser device, a parametric oscillator source, and a gas discharge lamp and further wherein said laser device is selected from the group consisting of a gas laser, a liquid laser, a chemical laser, a quantum cascade laser, a direct diode laser, and a diode pumped solid state laser and further wherein said gas laser is selected from the group consisting of a carbon dioxide laser emitting in the infrared band comprised of wavelengths between 7 and 15 micrometers and a carbon monoxide laser emitting in the infrared band comprised of wavelengths between 3 and 7 micrometers.

9. The identification system of claim 1, wherein said imaging device generates an electrical signal subsequently transmitted to said beacon for interrogation thereof, and further wherein said beacon only emits said beam upon said interrogation by said imaging device and further wherein said electrical signal is transmitted using a method selected from the group consisting of RF transmission and optical transmission.

10. A method for identifying an asset in a system comprising an imaging device comprising an array of detectors sensitive to wavelengths within a predetermined band and a display, the asset positioned at a distance to the imaging device, the method comprising:
    positioning a beacon in proximity to the asset;
    emitting using said beacon a beam of radiation comprised of wavelengths within the predetermined band and having a predetermined width at the distance; and
    directing said beam towards the imaging device;
    wherein said beam is of sufficient strength such that when said beam is incident on the array, an image of said beam projected on the display has a relative width which is greater than said predetermined width.

11. The method of claim 10, wherein the array of detectors is a Focal Plane Array and the detectors are thermal detectors.

12. The method of claim 10, wherein said sufficient strength is the strength sufficient such that said image of said beam projected on the display exhibits a blooming effect and further comprising adjusting a degree of said blooming effect by varying a level of power supplied to said beacon, thereby varying a level of said sufficient strength.

13. The method of claim 10, wherein said beacon is selected from the group consisting of a laser device, a parametric oscillator source, and a gas discharge lamp and further wherein said laser device is selected from the group consisting of a gas laser, a liquid laser, a chemical laser, a quantum cascade laser, a direct diode laser, and a diode pumped solid state laser.

14. The method of claim 10, further comprising after said positioning a beacon in proximity to the asset generating using the imaging device an electrical signal and transmitting said signal to said beacon for interrogation thereof, wherein said emitting using said beacon said beam of radiation only occurs upon said interrogation of said beacon by the imaging device.

15. A beacon for use in an identification system for identifying an asset, the system comprising an imaging device comprising an array of detectors sensitive to wavelengths within a predetermined band and a display, the beacon comprising:
    a source of radiation positioned in proximity to the asset and at a distance from the imaging device, said source of radiation emitting a beam of radiation comprised of wavelengths within the predetermined band and having a predetermined width at said distance; and
    a power supply for operating said source of radiation;
    wherein said beam is of sufficient strength such that when said beam is incident on the array, an image of said beam projected on the display has a relative width which is greater than said predetermined width.

16. The beacon of claim 15, wherein said image of the beam projected on the display exhibits a blooming effect and further wherein a degree of said blooming effect is adjustable by varying a level of power supplied to said beacon, thereby varying a level of said sufficient strength.

17. The beacon of claim 15, wherein said source of radiation is selected from the group consisting of a laser device, a parametric oscillator source, and a gas discharge lamp and further wherein said laser device is selected from the group consisting of a gas laser, a liquid laser, a chemical laser, a quantum cascade laser, a direct diode laser, and a diode pumped solid state laser.

18. The beacon of claim 17, further comprising a filter at an output of said laser device for removing unwanted collateral radiation emitted by said laser device.

19. The beacon of claim 17, wherein said laser device emits said beam in a selected one of continuous operation or pulsed operation.

20. The beacon of claim 17, wherein said gas discharge lamp emits said beam as a plurality of regular flashes.

21. The beacon of claim 17, further comprising an optical device positioned at an output of said gas discharge lamp for collimating an isotropic radiation emitted by said gas discharge lamp.

22. The beacon of claim 17, further comprising a separator positioned at an output of said gas discharge lamp for filtering specific wavelengths of said beam.

23. The beacon of claim 15, further comprising an optical device positioned at an output of said source of radiation for shaping said beam into one of a plurality of geometries.

24. The beacon of claim 23, wherein said beam is shaped as a collimated triangle originating at the beacon and further comprising a device for imparting motion to the beacon to distribute said beam in a plurality of directions over time and wherein said device is selected from the group consisting of a rotary motor, a magnet, a reflector comprising a ball bearing, a spinning mirror, and a prism.

* * * * *